(12) United States Patent
Liu et al.

(10) Patent No.: US 12,106,376 B2
(45) Date of Patent: Oct. 1, 2024

(54) METHOD AND APPARATUS FOR PROCESSING AN INSURANCE CLAIM

(71) Applicant: BEES360, INC., Katy, TX (US)

(72) Inventors: Kun Liu, Shenzhen (CN); Xiaoqing Wu, Shenzhen (CN)

(73) Assignee: BEES360, INC., Katy, TX (US)

( * ) Notice: Subject to any disclaimer, the term of this patent is extended or adjusted under 35 U.S.C. 154(b) by 381 days.

(21) Appl. No.: 17/537,369

(22) Filed: Nov. 29, 2021

(65) Prior Publication Data

US 2022/0084133 A1      Mar. 17, 2022

Related U.S. Application Data

(63) Continuation of application No. PCT/CN2020/093388, filed on May 29, 2020.

(30) Foreign Application Priority Data

May 30, 2019   (CN) .......................... 201910461185.9

(51) Int. Cl.
*G06Q 40/00* (2023.01)
*B64C 39/02* (2023.01)
*G06Q 40/08* (2012.01)
*B64U 101/30* (2023.01)

(52) U.S. Cl.
CPC .......... *G06Q 40/08* (2013.01); *B64C 39/024* (2013.01); *B64U 2101/30* (2023.01)

(58) Field of Classification Search
CPC .. G06Q 40/08; B64C 39/024; B64U 2101/30; B64U 10/13

USPC ............. 705/4, 2, 3, 39, 37, 38, 45, 40, 26; 713/153; 235/380, 379; 340/945; 348/625; 901/46; 382/103
See application file for complete search history.

(56) References Cited

U.S. PATENT DOCUMENTS

| | | | |
|---|---|---|---|
| 9,805,261 B1 | 10/2017 | Loveland et al. | |
| 10,129,508 B1 * | 11/2018 | Hillman | G06Q 50/16 |
| 10,134,092 B1 * | 11/2018 | Harvey | G06V 20/176 |
| 10,137,984 B1 | 11/2018 | Flick | |

(Continued)

FOREIGN PATENT DOCUMENTS

CN        109241922 A      1/2019

OTHER PUBLICATIONS

Technical evaluation for mashing up crowdsourcing images; 2015 23rd International Conference on Geoinformatics (pp. 1-6); Caodong Xie, Zhiehao Zhang, Jie Shan; Jun. 19, 2015. (Year: 2015).*

(Continued)

*Primary Examiner* — Tien C Nguyen

(57) ABSTRACT

Disclosed is a method and apparatus for processing an insurance claim. The user first files a claim, and then a drone is dispatched to take a photo of the claimed object at the location corresponding to location information contained in the claim so as to obtain a complete photo required for claim settlement. Then the damage of the claimed object is identified and marked out on the photo. Finally, the complete photo on which the damage has been identified and marked out is uploaded online, and the claimed object is measured and the damage of the claimed object is assessed according to the uploaded complete photo, thus formulating a claim report.

10 Claims, 11 Drawing Sheets

(56) References Cited

U.S. PATENT DOCUMENTS

| | | | |
|---|---|---|---|
| 2002/0055861 A1* | 5/2002 | King | G06Q 40/08 705/4 |
| 2003/0219169 A1* | 11/2003 | Sartor | H04N 5/208 348/625 |
| 2004/0064345 A1* | 4/2004 | Ajamian | G06Q 40/08 705/4 |
| 2004/0153346 A1* | 8/2004 | Grundel | G06Q 40/08 705/4 |
| 2008/0144884 A1* | 6/2008 | Habibi | G05D 1/0094 382/103 |
| 2009/0265193 A1* | 10/2009 | Collins | G06Q 30/0185 901/46 |

OTHER PUBLICATIONS

Applying Image Analysis to Auto Insurance Triage: A Novel Application; 2007 IEEE 9th Workshop on Multimedia Signal Processing (pp. 280-283); Ying Li, C. Dorai; Oct. 1, 2007. (Year: 2007).*
International Search Report issued in corresponding International application No. PCT/CN2020/093389, mailed Aug. 26, 2020.
Written Opinion of the International Searching Authority for No. PCT/CN2020/093389.

* cited by examiner

1. Image acquisition 2. 3D point cloud reconstruction

3. Denoising section

4. Measurement report

METHOD AND APPARATUS FOR PROCESSING AN INSURANCE CLAIM

CROSS-REFERENCE TO RELATED APPLICATIONS

This application is a U.S. continuation of co-pending International Patent Application Number PCT/CN2020/093388, filed on May 29, 2020, which claims the priority of Chinese Patent Application Number 201910461185.9, filed on May 30, 2019 with China National Intellectual Property Administration, the disclosures of which are incorporated herein by reference in their entireties.

TECHNICAL FIELD

This disclosure relates to the field of insurance claims, and more particularly relates to a method and apparatus for processing an insurance claim.

BACKGROUND

With the continuing improvement of drone technology and the updating and iterating of flight control technology, drones have been used to capture the photos of houses or other buildings, which are then passed on to systematic processing and analysis, combined with automatic reporting technology, a complete drone investigation process has been established and applied in the insurance industry. The traditional claim settlement process relies on manual inspection, sampling, and analysis, which is laborious and poses considerable risks to the investigation personnel. Especially in areas prone to extreme weather, e.g., in the aftermath of a typhoon, investigators cannot arrive at the scene in the first time for data collection. Furthermore, during the investigation process, various weather or uncontrollable factors may threaten the personal safety of investigators. The quality of data will also be disturbed by various factors.

Through the drone automatic flight and investigation process, the drone can be operated remotely to perform data collection in the scene in the first time. The automatic flight operation minimizes the interference of human factors and ensures the high quality and consistency of the collected data. Then by the analysis and processing of the system, an investigation report is automatically formulated, which greatly shortens the processing cycle of a claim case, and reduces the risk and cost of the claim settlement process to the greatest extent for the insurance company.

The automatic flight and investigation process technology based on drones has been promoted and used in insurance claim settlement in the United States, mainly for purposes of post-disaster claim settlement after large-scale forest fire and wind disasters, as well as floods. For example, both in the forest fire that occurred in California in November 2018 and in the hurricane that occurred in North Carolina in October 2018, the second largest housing insurance company in the United States has adopted drone automatic flight technology and systems for large-area data collection on house damage, and analyzes, assesses and saves the photos through the system, and further accepts the report generated by the system as the basis for claim settlement. Meanwhile, LovelandInnovation LLC and Kespry both cooperated with the top ten housing insurance companies in the United States to use drones to collect claim data, improve the processing cycle of insurance claims, which is gradually promoted in the industry.

At present, the application of drone technology in insurance claim settlement still has two major shortcomings. The first is to collect the necessary data required for automatic flight regarding houses of different shapes, sizes, and contours; the second is to automatically process photo information so as to automatically convert the photo information into reports required for insurance claim settlement.

First, in terms of collecting data using drones, some companies choose to modify the drone itself to load more equipment, and at the same time add supporting equipment to ensure the normal operation of the drone. However, first of all, the cost of the drone itself will be greatly increased, and due to the limitation of production capacity, it cannot be promoted and used on a large scale. Some other companies choose to replace different equipment or lenses to be used with the drone to collect enough data through multiple takeoffs and landings of the drone. Such multiple collections will however increase the difficulty of post-processing photos and increase the time period required for post-processing because the correlation between the data decreases.

Second, the manual processing of photo information is the current processing method adopted by most insurance, claims, and housing companies. The labor cost is high, and it is easy to misjudge or lose part of the damage information.

SUMMARY

Embodiments of this disclosure provide a method and apparatus for processing an insurance claim, so as to at least solve the technical problem of slow image data processing speed in the existing insurance claim settlement process.

According to an embodiment of this disclosure, a method of processing an insurance claim is provided, which includes the following operations:

filing a claim by a user;

dispatching a drone to take a picture of a claimed object at a location corresponding to location information contained in the claim to obtain a complete photo required for claim settlement, and identifying and marking damage of the claimed object on the complete photo;

uploading the complete photo on which the damage of the claimed object has been identified and marked online through a network, performing measurement and damage assessment for the claimed object according to the uploaded complete photo, and formulating a claim report.

The method may further include:

reviewing the claim report, and submitting the claim report to an insurance company after passing the review.

Further, the user may file the claim through a mobile phone application, and the flight parameters of the drone are set;

the drone is equipped with a drone automatic flight algorithm, which adjusts the drone's flight trajectory according to the set flight parameters and the shape and size of the claimed object, so as to take the least number of photos while achieving most comprehensive coverage of the entire claimed object, where the damage of the claimed object is identified and marked out on the complete photo by the drone automatic flight algorithm.

Further, the flight parameters of the drone may include: an outermost boundary of the land where the claimed object is located, an outer boundary of the claimed object itself, a number of layers of the claimed object, and an estimated height of the highest obstacle around the claimed object.

Further, the modes for taking photos of the claimed object may include: overview shooting, 360-degree flight shooting, overall claimed object shooting, and claimed object details close-up shooting;

The height settings for taking photos of the claimed object include: overview shooting is shooting at the highest point, the 360-degree flight shooting is shooting at the second highest point, the overall claimed object shooting is shooting at the third highest point, and the claimed object details close-up shooting is shooting at the lowest point.

Further, the drone automatic flight algorithm may determine the height and angle for the photo capture according to an empirical formula stored therein at the claimed object details close-up shooting mode.

Further, the claimed object is a house, and the number of photos taken of the house is 30-100.

Further, the operation uploading the complete photo on which the damage of the claimed object has been identified and marked online through a network, performing measurement and damage assessment for the claimed object according to the uploaded complete photo, and formulating a claim report may include:

uploading the complete photo on which the damage of the claimed object has been identified and marked out to a claim platform, performing 3D point cloud reconstruction and denoising section processing on the complete photo by the claim platform, and conducting a preliminary review of the complete photo, after the preliminary review is passed, measuring the claimed object, assessing the damage of the claimed object, and formulating a claim report, otherwise if the preliminary review fails, informing, by the claim platform, the drone of the missing photo information and controlling the drone to perform a secondary photo data collection.

According to another embodiment of this disclosure, there is provided an apparatus for processing an insurance claim, which includes:

a claim filing unit configured for allowing a user to file a claim;

a photographing unit configured for dispatching a drone to take a picture of a claimed object at a location corresponding to location information contained in the claim to obtain a complete photo required for claim settlement, and identifying and marking damage of the claimed object on the complete photo;

a claim report generation unit configured for uploading online the complete photo on which the damage of the claimed object has been identified and marked through a network, performing measurement and damage assessment for the claimed object according to the uploaded complete photo, and formulating a claim report.

The apparatus may further include:

a claim report submission unit configured for reviewing the claim report, and submitting the claim report to an insurance company after passing the review.

The method and apparatus for processing an insurance claim that are provided in the embodiments of this disclosure may offer the following beneficial effects.

First of all, the drone automatic flight and collection technology according to the present disclosure does not require any modification to the drone. The automatic flight algorithm and flight modes of the drone are integrated into the mobile phone application, and the user can directly download and install it.

Second, one-time data collection retains complete data correlation, and the marked data during flight speeds up the post-processing time.

Third, all high-definition pictures can be uploaded automatically without removing the drone's storage disk.

Fourth, the construction of the system process, the automatic damage recognition algorithm, and the automatic report formulation minimize the post-processing time of claims and greatly reduce the cost of claims.

DETAILED DESCRIPTION

For a better understanding of the objectives, technical solutions, and advantages of the present application, hereinafter the present application will be described in further detail in connection with the accompanying drawings and some illustrative embodiments. It is to be understood that the specific embodiments described here are intended for the mere purposes of illustrating this application, instead of limiting.

Embodiment 1

Figure 1:
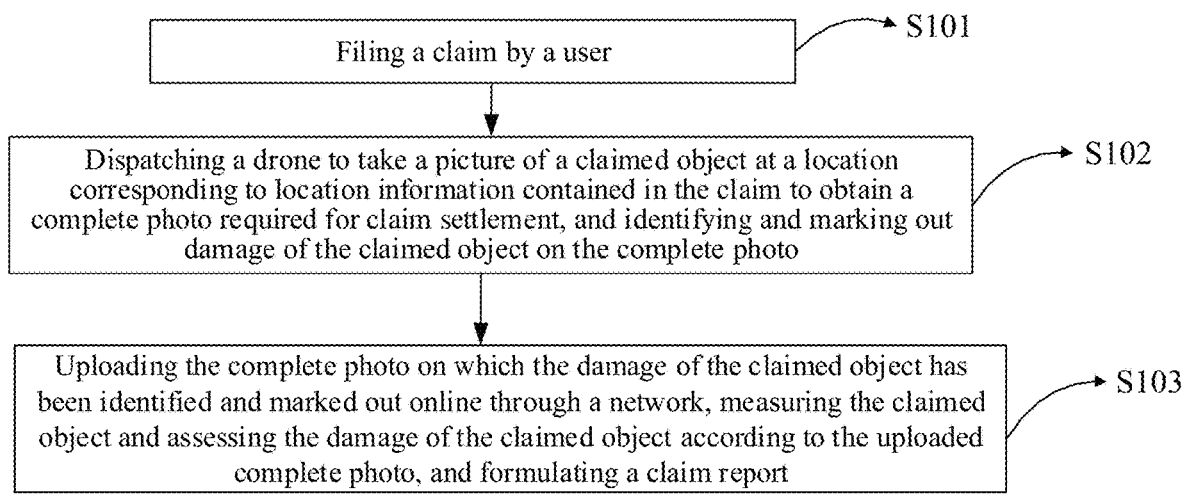
FIG. 1 is a flowchart illustrating a method of processing an insurance claim according to this disclosure.

According to an embodiment of this disclosure, a method of processing an insurance claim is provided, which includes the following operations S101-S103, as illustrated in FIG. 1.

S101: filing a claim by a user;

S102: dispatching a drone to take a picture of a claimed object at a location corresponding to location information contained in the claim to obtain a complete photo required for claim settlement, and identifying and marking damage of the claimed object on the complete photo;

S103: uploading the complete photo on which the damage of the claimed object has been identified and marked online through a network, performing measurement and damage assessment for the claimed object according to the uploaded complete photo, and formulating a claim report.

The drone automatic flight and collection technology according to the present disclosure does not require any modification to the drone. The automatic flight algorithm and flight modes of the drone are integrated into the mobile phone application, and the user can directly download and install it. The one-time data collection according to this disclosure retains complete data correlation, and the marked data during flight speeds up the post-processing time. Furthermore, all high-definition pictures can be uploaded automatically without removing the drone's storage disk. Further, the construction of the system process, the automatic damage recognition algorithm, and the automatic report formulation minimize the post-processing time of claims and greatly reduce the cost of claims.

Figure 2:
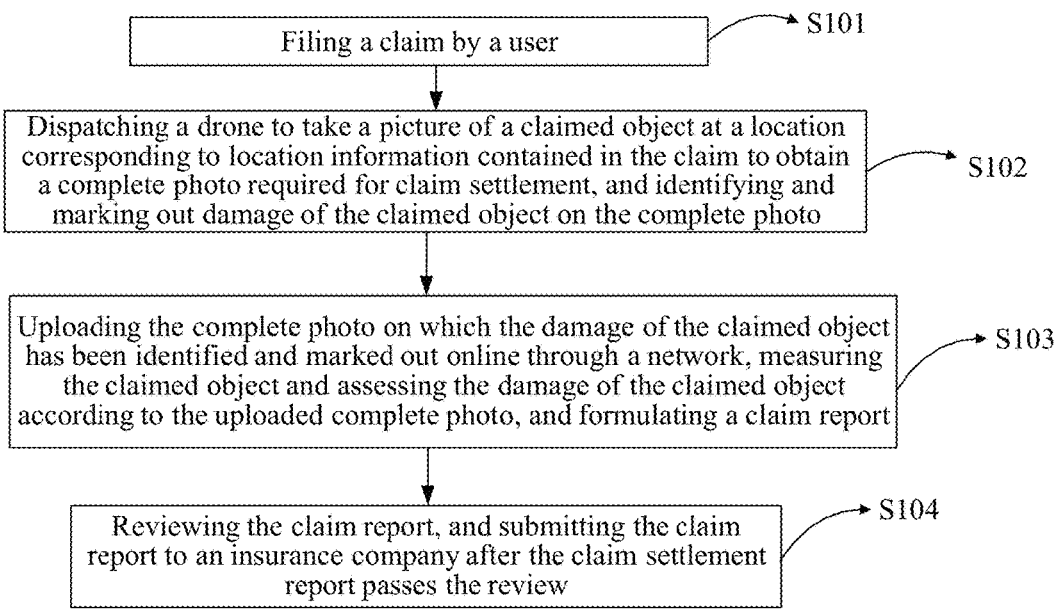
FIG. 2 is an illustrative flowchart of a method of processing an insurance claim according to this disclosure.

As a typical technical solution, referring to FIG. 2, the method may further include:

S104: reviewing the claim report, and submitting the claim report to an insurance company after passing the review.

As a typical technical solution, the user may file the claim through a mobile phone application, and the flight parameters of the drone are set;

the drone is equipped with a drone automatic flight algorithm, which adjusts the drone's flight trajectory according to the set flight parameters and the shape and size of the claimed object, so as to take the least number of photos while achieving most comprehensive coverage of the entire claimed object, where the damage of the claimed object is identified and marked out on the complete photo by the drone automatic flight algorithm.

As a typical technical solution, the flight parameters of the drone may include: an outermost boundary of the land where the claimed object is located, an outer boundary of the claimed object itself, a number of layers of the claimed object, and an estimated height of the highest obstacle around the claimed object.

As a typical technical solution, the modes for taking photos of the claimed object may include: overview shooting (Overhead shooting), 360-degree flight shooting (Oblique shooting), overall claimed object shooting (Lawnmower shooting), and claimed object details close-up shooting (Snapshot shooting);

and the height settings for taking photos of the claimed object may include: overview shooting is shooting at the highest point, the 360-degree flight shooting is shooting at the second highest point, the overall claimed object shooting is shooting at the third highest point, and the claimed object details close-up shooting is shooting at the lowest point.

As a typical technical solution, the drone automatic flight algorithm may determine the height and angle for the photo capture according to an empirical formula stored therein at the claimed object details close-up shooting mode.

As a typical technical solution, the claimed object is a house, and the number of photos taken of the house is 30-100.

As a typical technical solution, the operation uploading the complete photo on which the damage of the claimed object has been identified and marked online through a network, performing measurement and damage assessment for the claimed object according to the uploaded complete photo, and formulating a claim report may include:

uploading the complete photo on which the damage of the claimed object has been identified and marked out to a claim platform, performing 3D point cloud reconstruction and denoising section processing on the complete photo by the claim platform, and conducting a preliminary review of the complete photo, after the preliminary review is passed, measuring the claimed object, assessing the damage of the claimed object, and formulating a claim report, otherwise if the preliminary review fails, informing, by the claim platform, the drone of the missing photo information and controlling the drone to perform a secondary photo data collection.

The method according to this disclosure innovatively develops a set of algorithms and processes in terms of the automatic flight of drones, which are developed into a mobile phone application. After the user simply enters a few necessary parameters, the drone will take off with the press of on key and complete the data collection in one go. Then the drone automatically returns and automatically uploads the data. This improvement avoids incomplete data that may be caused by manual data collection, and at the same time, all photo data is marked by algorithms, which greatly improves the speed and accuracy of post-data processing.

At the same time, in terms of automatically processing photo information, the present disclosure will provide the customer with a complete damage assessment report within 1-3 minutes after the drone returns the photos to its processing platform (claim platform). For each captured photo, the damage will be identified and marked out. For the damage caused by high winds and hail, the recognition rate of the method provided by the present disclosure can reach to higher than 95%.

Hereinafter, the method for processing an insurance claim according to the present disclosure will be described in further detail in connection with specific embodiments.

This disclosure mainly includes the following aspects:

1. Application of drone automatic flight and collection technology in insurance industry;

2. The insurance claim settlement method of the present disclosure that includes the overall process of data collection, data processing, and final completion and submission of a report to the insurance company.

Drone Automatic Flight and Collection Technology:

For different types of house shapes and sizes, the drone automatic flight algorithm of the present disclosure can adjust the flight trajectory according to the set parameters, so as to achieve the most comprehensive coverage of the entire house information with the least number of photos, thereby providing a complete claim report.

Figure 3:
FIG. 3 is a rendering of a drone's automatic flight and data collection mode on a mobile phone application.

FIG. 3 is a rendering of a drone's automatic flight and data collection mode on a mobile phone application. The user needs to use the mobile application to define the four flight parameters of the drone before taking off. The first is the outermost boundary of the land where the house or building is located (the solid line of the outer circle), and the second is the outer boundary of the house or building itself (the solid line in the inner circle), the third is the number of floors of the house, and the last is the estimated height of the tallest obstacle around the house or building. When the four parameters are defined, the drone's automatic flight algorithm will automatically calculate the drone's optimal flight route and the shooting angle required for each photo.

Figure 4:
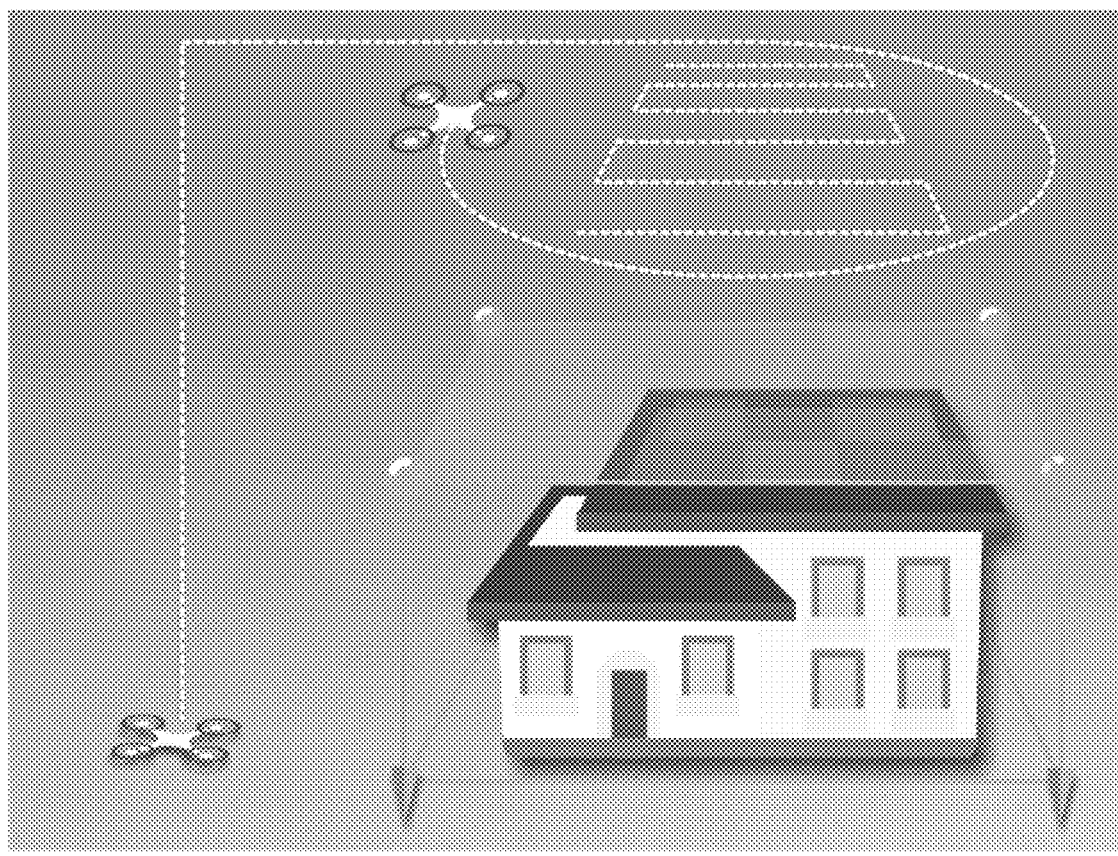
FIG. 4 is a simulation diagram of a drone's automatic flight and data collection mode.

FIG. 4 is a simulation diagram of a drone's automatic flight and data collection mode, which shows the definition of the heights of the house and surrounding obstacles. A house generally refers to a whole with a physical boundary. The height of a surrounding obstacle refers to the vertical distance from the bottom of the house to the highest point of this surrounding obstacle, which can help the drone to avoid obstacles automatically, so that the drone's automatic flight algorithm can give the optimal shooting height.

Figure 7:
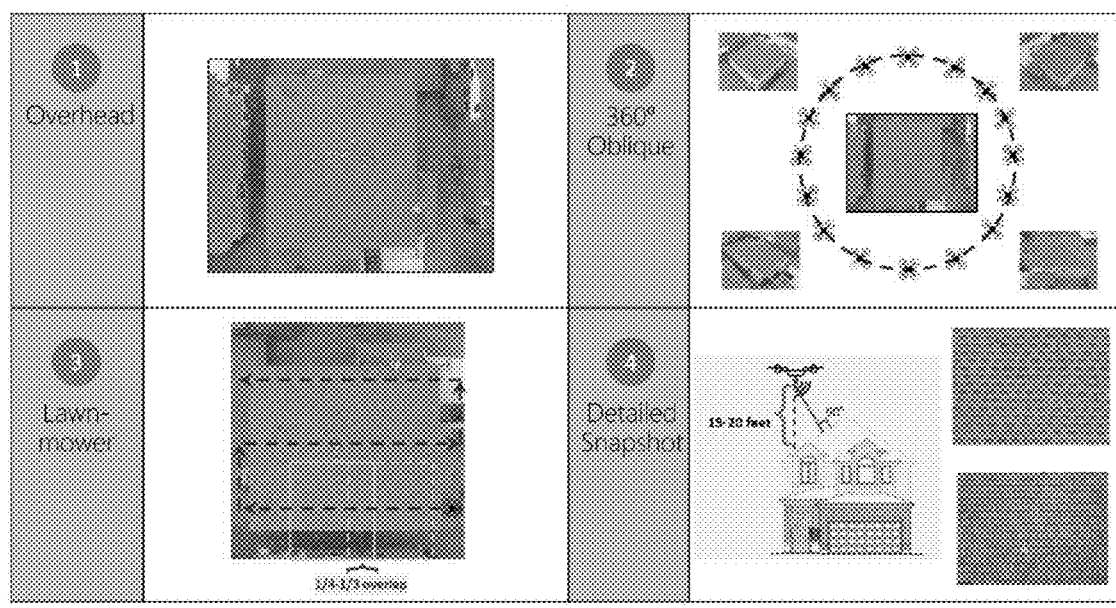
FIG. 7 is a diagram illustrating four shooting modes in the automatic flight of the drone.

FIG. 7 is a diagram illustrating four shooting modes in the automatic flight of the drone. The definition of these modes is a summary of experience obtained by classifying, comparing, and optimizing photos collected from the flights for thousands of houses. Generally included is overview shooting (top-down overview shooting of the house or building), 360-degree flight shooting (360-degree flight shooting around the house or building), overall roof shooting (scanning the details of the entire roof on the house or building), as well as close-up shooting of roof details (collecting the most detailed close-up shots on the roof of a house or building), and so on.

Figure 8:
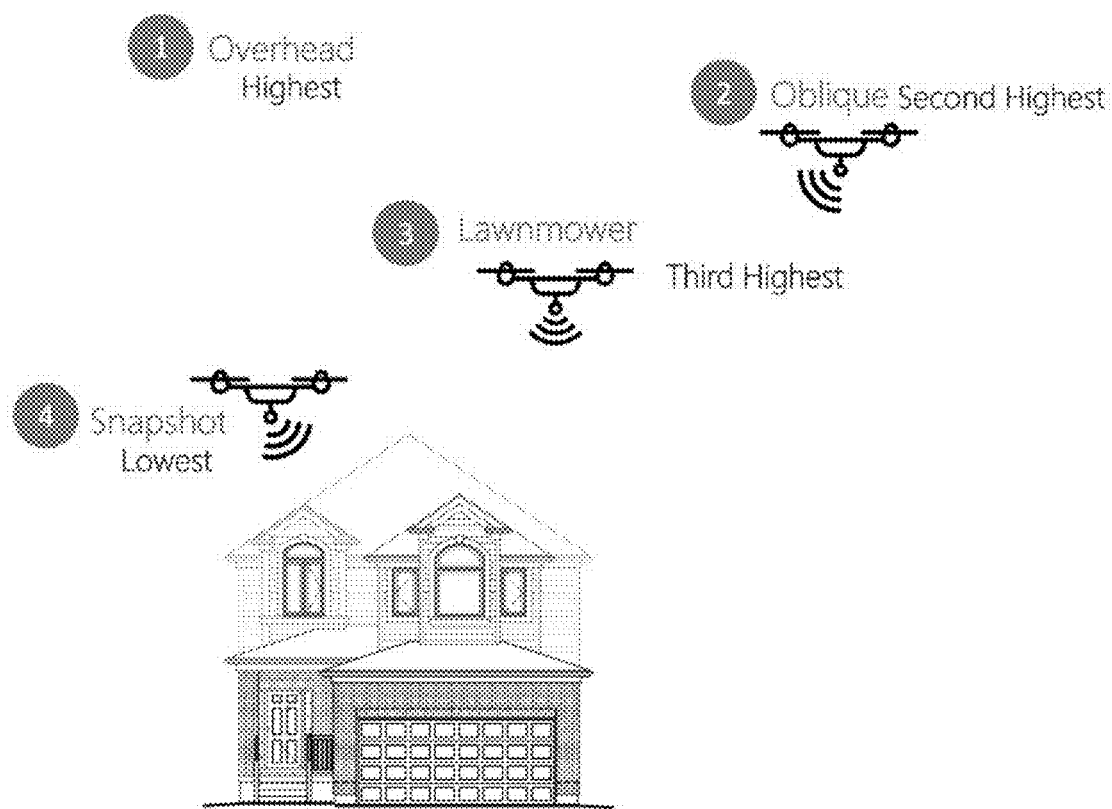
FIG. 8 is a diagram illustrating the relative flying heights of the four shooting methods shown in FIG. 7.

FIG. 8 is a diagram illustrating the relative flying heights of the four shooting modes depicted in FIG. 7. As illustrated in FIG. 8, the overview shooting mode is used at the highest point, the 360-degree flight shooting mode is used at the second highest point, the overall roof shooting mode is used at the third highest point, and the roof details close-up shooting mode is used at the lowest point.

Figure 9:
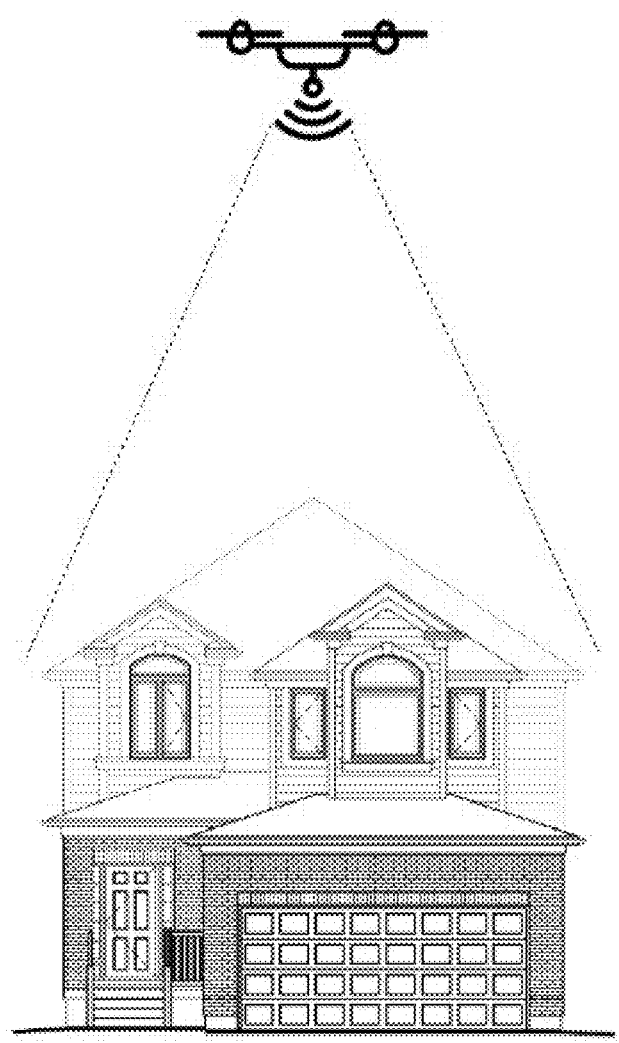
FIG. 9 is a diagram illustrating the first mode shown in FIG. 7.

FIG. 9 is a diagram illustrating the first mode depicted in FIG. 7, which is a top-down overview of the house or building. In the process of assessing the damage of the house, the photos taken in this flight mode will be used as a map of the house, and all the detected damage will finally be projected to this picture, thus providing the insurance company with a global reference picture.

Figure 10:
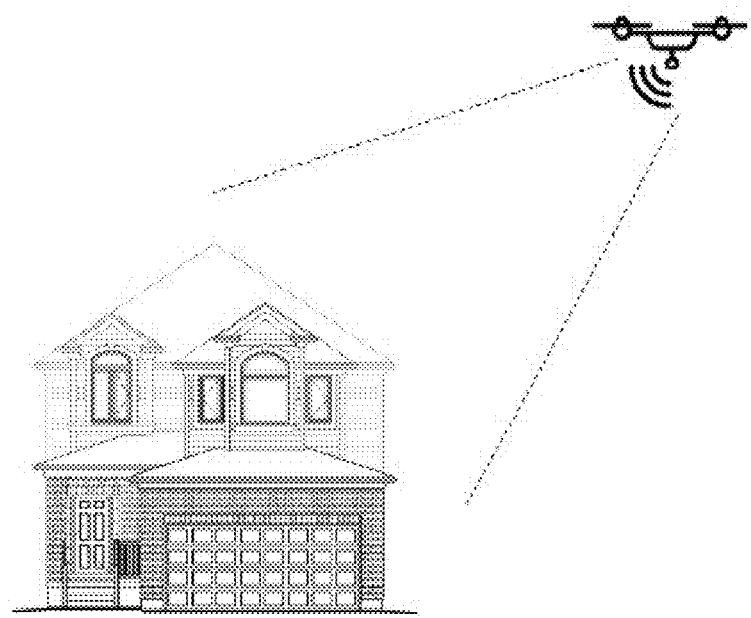
FIG. 10 is a diagram illustrating the second mode shown in FIG. 7.

FIG. 10 is a diagram illustrating the second mode depicted in FIG. 7, which includes a 360-degree flight around the house or building, while capturing pictures from different angles of the house periphery. This kind of pictures plays a vital role in the generation of house measurement data.

Figure 11:
FIG. 11 is a diagram illustrating the third mode shown in FIG. 7.

FIG. 11 is a diagram illustrating the third mode depicted in FIG. 7, which is a detailed picture of the entire roof scanned above the roof of the house or building. Such picture is used to connect and establish correlations between the pictures taken in the first and fourth modes.

Figure 12:
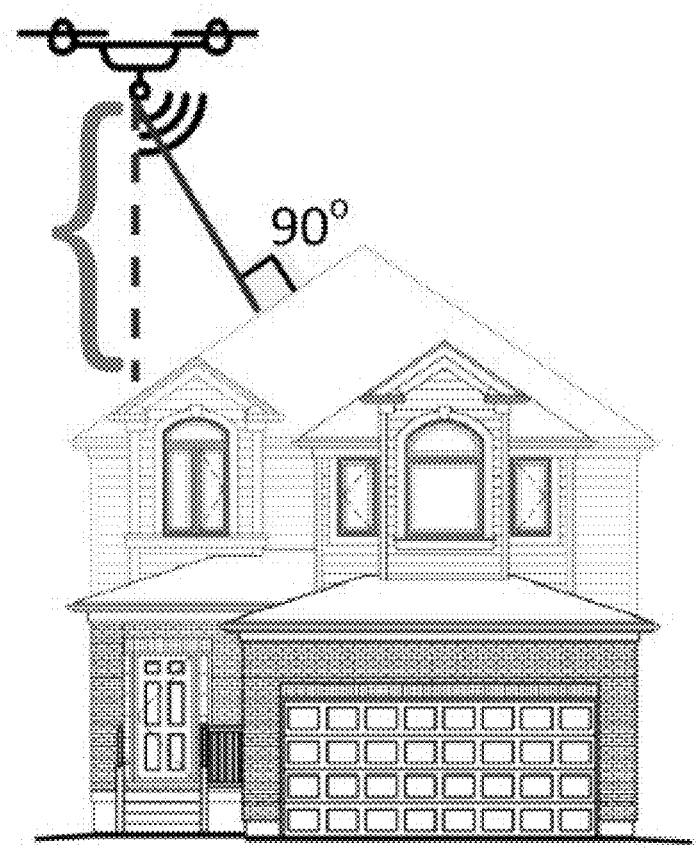
FIG. 12 is a diagram illustrating the fourth mode shown in FIG. 7.

FIG. 12 is a diagram illustrating the fourth mode depicted in FIG. 7, which is the most detailed close-up photograph of the roof of the house or building. The empirical formula in the automatic flight algorithm of the drone determines the height and angle of the close-up photo capturing, so as to obtain the clearest photo for automatic damage identification. Limited by the sharpness of the drone lens (4K lens, no zoom or only 2× zoom), only photos collected at close range can be used for purposes of damage identification, and an accuracy of not less than 90% is guaranteed. Combining the above four shooting modes, generally a house or building needs to collect 30-100 photos depending on the size of the house or building.

Figure 13:
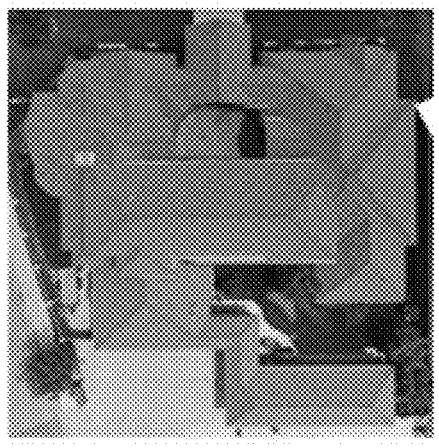
FIG. 13 is a diagram illustrating the three-dimensional measurement result that is formed based on the high-definition photos captured by the drone.
Figure 13:
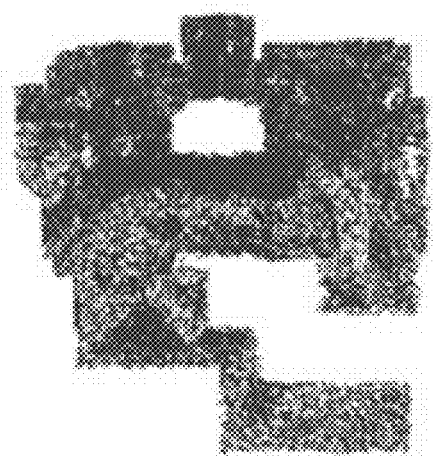
Figure 13:
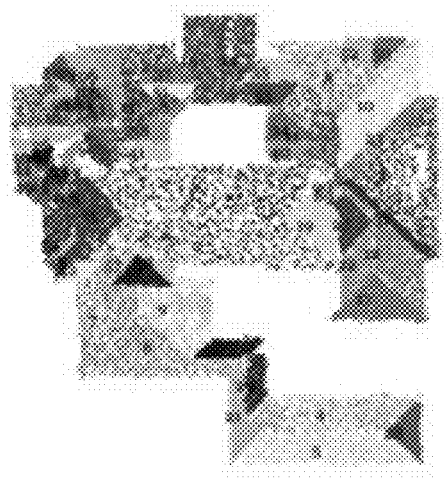
Figure 13:
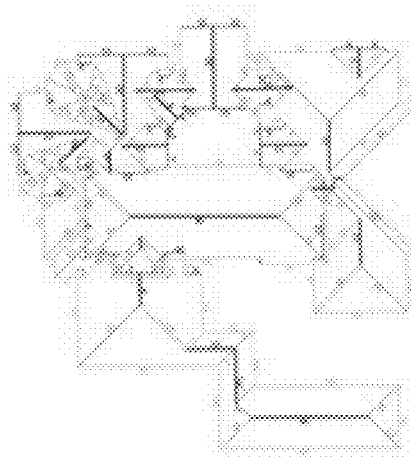

FIG. 13 is a diagram illustrating the three-dimensional measurement result that is formed based on the high-definition photos captured by the drone. It includes four processing steps, which are image acquisition, 3D point cloud reconstruction, denoising section plane, and measurement report generation. In terms of the measurement precision of the drone photos collected in the automatic flight mode of the present disclosure the linear precision exceeds 99.5%, and the area precision exceeds 99%. It has earned general acceptance and recognition by the insurance industry in the United States. In terms of the processing time, the technology of the present disclosure is far ahead of other similar technologies.

Claim Platform:

After the drone photos are obtained, the photos will be automatically uploaded to the claim platform, which integrates the various functions and application interfaces required in the process.

Figure 5:
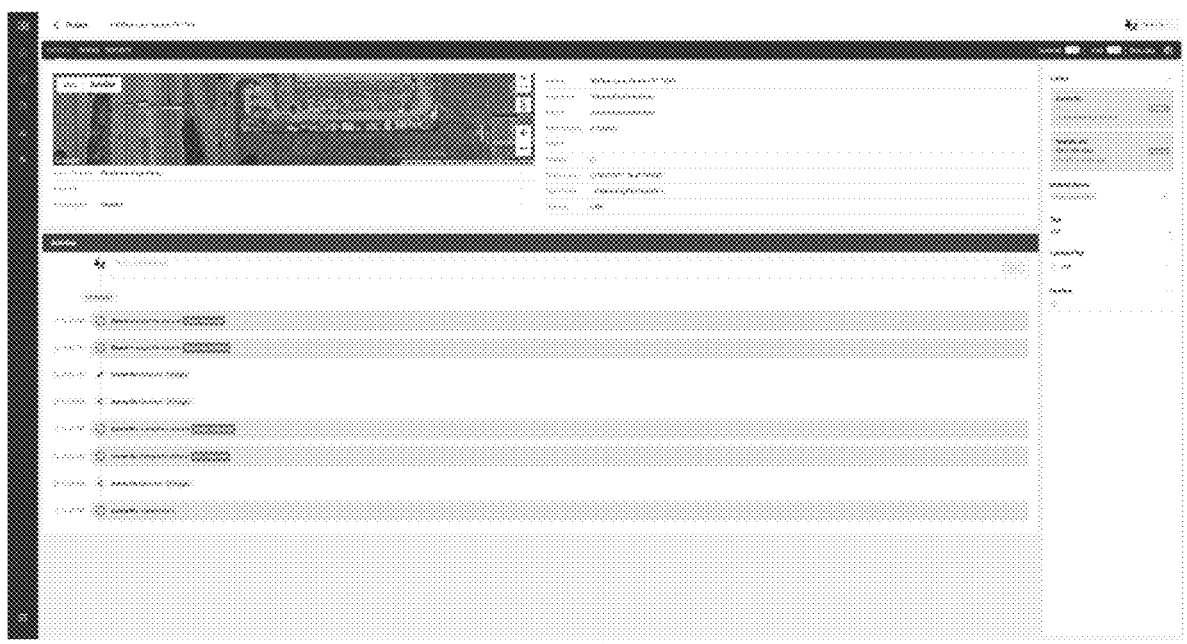
FIG. 5 is a diagram of a claim information page of a claim settlement case.

FIG. 5 is a diagram of a claim information page of a claim settlement case. which contains the address of the house to be settled, the head of the household, insurance information, inspection arrangements, and other related content. At the same time, the user is allowed to select the type of report required on this page.

Figure 14:
FIG. 14 is a diagram illustrating all the photos obtained by the drone as well as the classification information.

FIG. 14 is a diagram illustrating all the photos obtained by the drone as well as the classification information. Users can upload, download, delete, and add photos related to claim settlement on this page.

Figure 15:
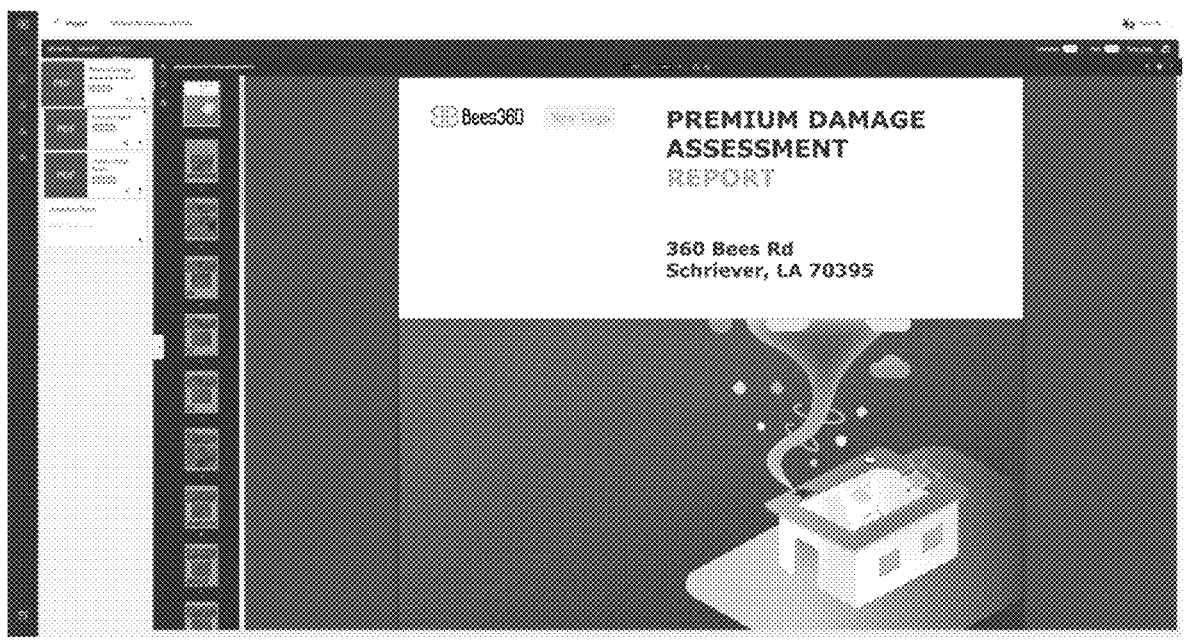
FIG. 15 illustrates a page for viewing and downloading the report.

FIG. 15 illustrates a page for viewing and downloading the report. This page clearly displays all the reports required by the user. The user can download the report directly, or share the report to others directly through the claim platform by email.

The claim platform according to this disclosure is a multifunctional platform, and different page designs can be made depending on the nature and needs of different enterprises. The three pages mentioned above (the pages in FIG. 5, FIG. 14, and FIG. 15) are pages designed for insurance claims.

Figure 16:
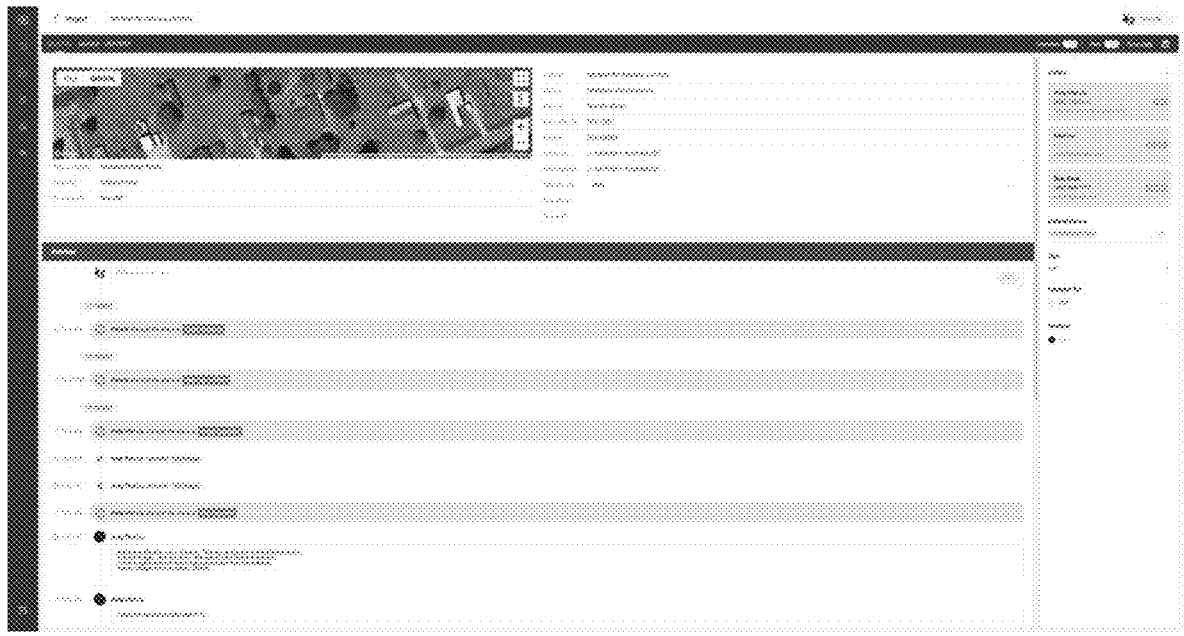
FIG. 16 illustrates a bidding page of the claim platform.

FIG. 16 illustrates a bidding page of the claim platform, which is specially designed for house maintenance companies and is also a direction for expansion of the use of the platform.

Figure 6:
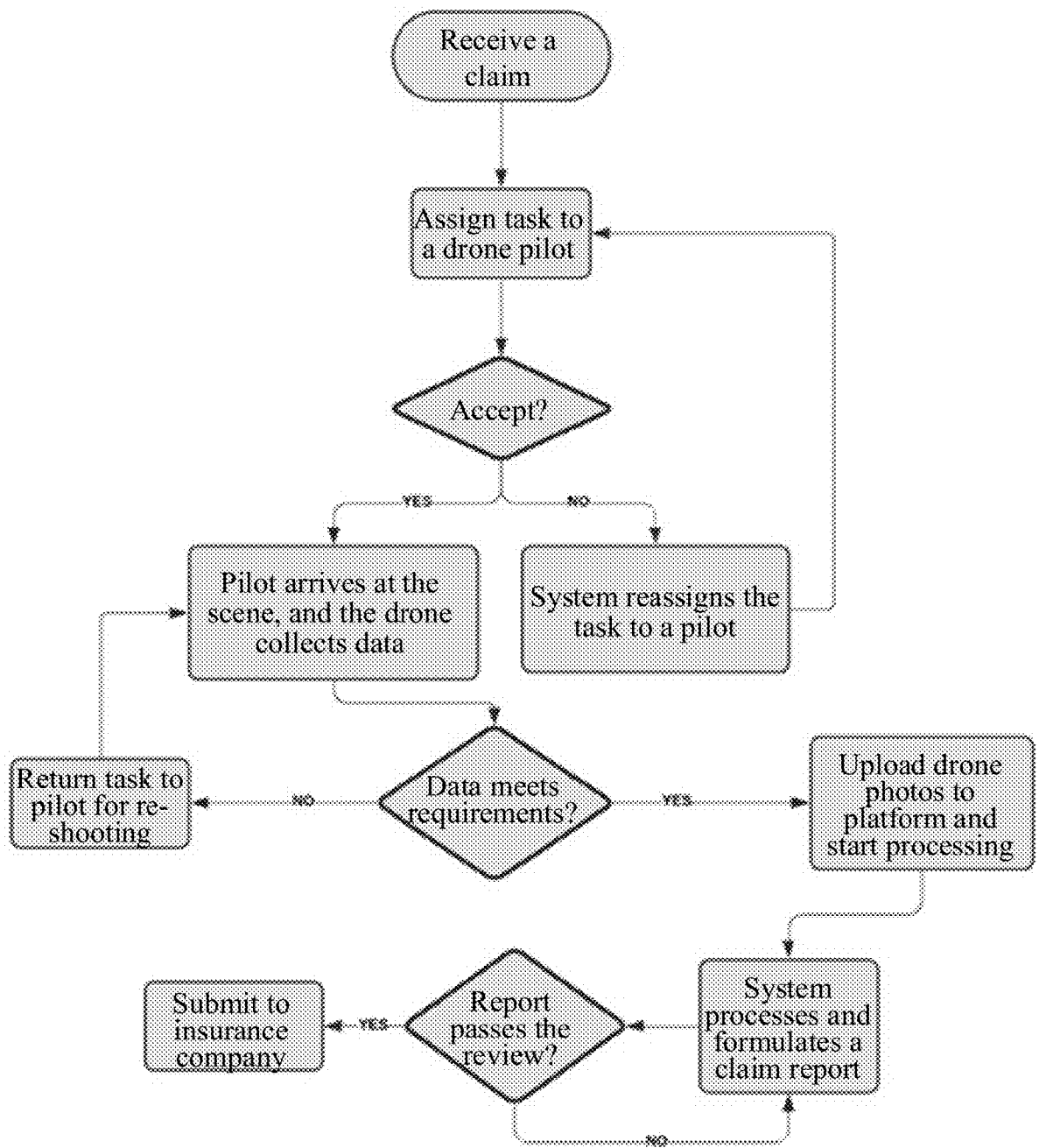
FIG. 6 is a flowchart illustrating the entire process of a method of processing an insurance claim.

Claim Settlement Process:

FIG. 6 is a flowchart illustrating the entire process of a method of processing an insurance claim.

Figure 17:
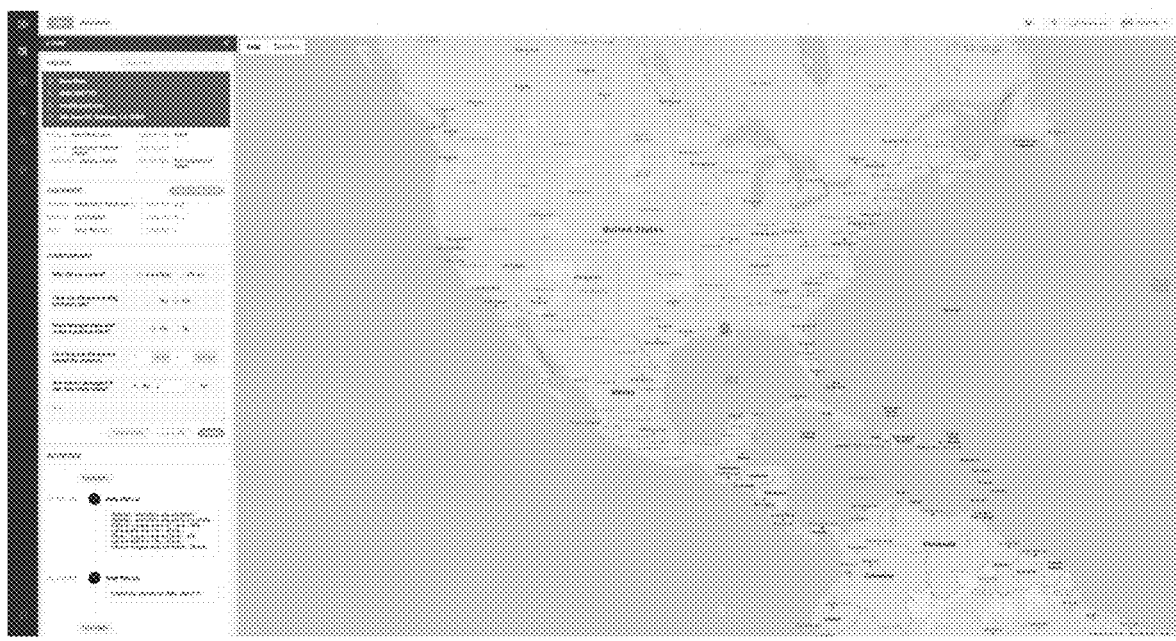
FIG. 17 illustrates a page for manually assigning tasks.

When a claim is received, the method will search for drone pilots within 50 kilometers of the surrounding area based on the location of the building, automatically select the appropriate pilot based on the pilots' previous ratings and service ranges, and assign the task to that pilot. The pilot can accept or reject the task through the mobile app. If the task is rejected, the manager will step in for manual assignment and confirmation. FIG. 17 illustrates a page for manually assigning tasks.

After accepting the task, the pilot needs to contact the head of the household within 24 hours to confirm the investigation time, and arrive at the scene on time at the agreed investigation time for data collection and drone photo upload.

After the drone photos are uploaded back to the claim platform, the drone's automatic flight algorithm will automatically detect from multiple angles whether the photos meet the requirements and whether the information required for the claim is complete. If the preliminary review according to the method is passed, the method will automatically start to perform the house measurement and damage assessment, and finally formulate a complete claim report. If the preliminary review is not passed, the pilot will be notified of the missing information, and the pilot will conduct a secondary data collection.

After the claim report is approved, it will be directly submitted to the insurance company, which is convenient for the insurance company to carry out subsequent claim settlement matters.

Embodiment 2

Figure 18:
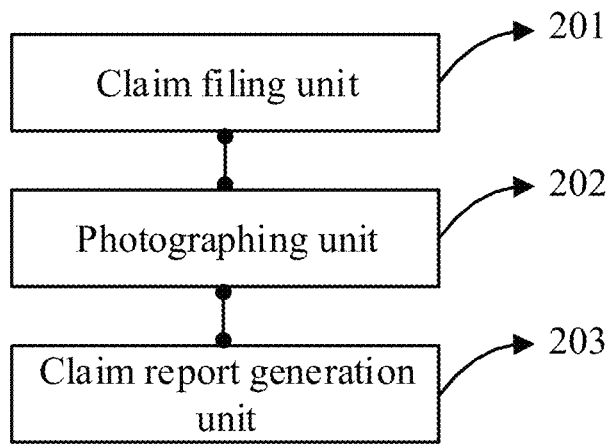
FIG. 18 is a block diagram illustrating an apparatus for processing an insurance claim according to this disclosure.

According to another embodiment of this disclosure, there is provided an apparatus for processing an insurance claim, which includes a claim filing unit 201, a photographing unit 202, and a claim report generation unit 203, as illustrated in FIG. 18.

The claim filing unit 201 is used for a user to file a claim. The claim filing unit 201 may be a mobile phone application used by the customer.

The photographing unit 202 is configured for dispatching a drone to take a picture of a claimed object at a location corresponding to location information contained in the claim to obtain a complete photo required for claim settlement 202, and identifying and marking damage of the claimed object on the complete photo.

The claim report generation unit 203 is configured for uploading online the complete photo on which the damage of the claimed object has been identified and marked through a network, performing measurement and damage assessment for the claimed object according to the uploaded complete photo, and formulating a claim report. The claim report generation unit 203 may be the following claim platform.

The drone automatic flight and collection technology according to the present disclosure does not require any modification to the drone. The automatic flight algorithm and flight modes of the drone are integrated into the mobile phone application, and the user can directly download and install it. The one-time data collection according to this disclosure retains complete data correlation, and the marked data during flight speeds up the post-processing time. Furthermore, all high-definition pictures can be uploaded automatically without removing the drone's storage disk. Further, the construction of the apparatus process, the automatic damage recognition algorithm, and the automatic report formulation minimize the post-processing time of claims and greatly reduce the cost of claims.

Figure 19:
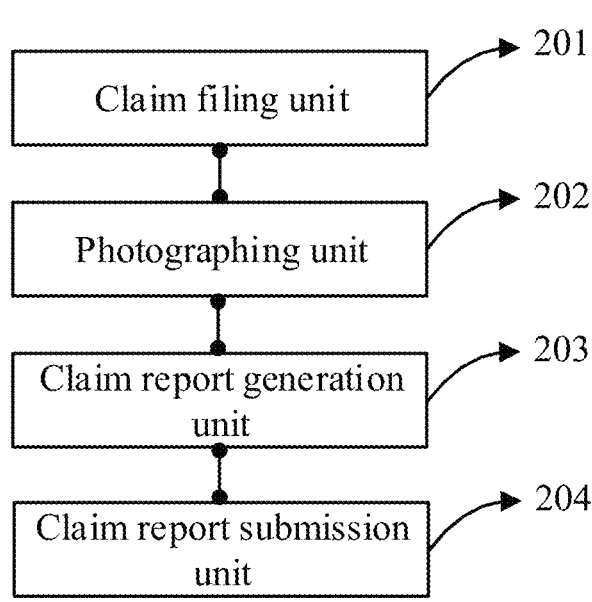
FIG. 19 is an exemplary block diagram illustrating an apparatus for processing an insurance claim according to this disclosure.

As a typical technical solution, referring to FIG. 19, the apparatus may further include:

a claim report submission unit 204 configured for reviewing the claim report, and submitting the claim report to an insurance company after passing the review.

The apparatus according to this disclosure innovatively develops a set of algorithms and processes in terms of the automatic flight of drones, which are developed into a mobile phone application. After the user simply enters a few necessary parameters, the drone will take off with the press of on key and complete the data collection in one go. Then the drone automatically returns and automatically uploads the data. This improvement avoids incomplete data that may be caused by manual data collection, and at the same time, all photo data is marked by algorithms, which greatly improves the speed and accuracy of post-data processing.

At the same time, in terms of automatically processing photo information, the present disclosure will provide the customer with a complete damage assessment report within 1-3 minutes after the drone returns the photos to its processing platform (claim platform). For each captured photo, the damage will be identified and marked out. For the damage caused by high winds and hail, the recognition rate of the method and apparatus provided by the present disclosure can reach to higher than 95%.

Hereinafter, the apparatus for processing an insurance claim according to the present disclosure will be described in further detail in connection with specific embodiments.

This disclosure mainly includes the following aspects:

1. Application of drone automatic flight and collection technology in insurance industry;

2. The insurance claim settlement apparatus of the present disclosure that includes the overall process of data collection, data processing, and final completion and submission of a report to the insurance company.

Drone Automatic Flight and Collection Technology:

For different types of house shapes and sizes, the drone automatic flight algorithm of the present disclosure can adjust the flight trajectory according to the set parameters, so as to achieve the most comprehensive coverage of the entire house information with the least number of photos, thereby providing a complete claim report.

FIG. 3 is a rendering of a drone's automatic flight and data collection mode on a mobile phone application. The user needs to use the mobile application to define the four flight parameters of the drone before taking off. The first is the outermost boundary of the land where the house or building is located (the solid line of the outer circle), and the second is the outer boundary of the house or building itself (the solid line in the inner circle), the third is the number of floors of the house, and the last is the estimated height of the tallest obstacle around the house or building. When the four parameters are defined, the drone's automatic flight algorithm will automatically calculate the drone's optimal flight route and the shooting angle required for each photo.

FIG. 4 is a simulation diagram of a drone's automatic flight and data collection mode, which shows the definition of the heights of the house and surrounding obstacles. A house generally refers to a whole with a physical boundary. The height of a surrounding obstacle refers to the vertical distance from the bottom of the house to the highest point of this surrounding obstacle, which can help the drone to avoid obstacles automatically, so that the drone's automatic flight algorithm can give the optimal shooting height.

FIG. 7 is a diagram illustrating four shooting modes in the automatic flight of the drone. The definition of these modes is a summary of experience obtained by classifying, comparing, and optimizing photos collected from the flights for thousands of houses. Generally included is overview shooting (top-down overview shooting of the house or building), 360-degree flight shooting (360-degree flight shooting around the house or building), overall roof shooting (scanning the details of the entire roof on the house or building), as well as close-up shooting of roof details (collecting the most detailed close-up shots on the roof of a house or building), and so on.

FIG. 8 is a diagram illustrating the relative flying heights of the four shooting modes depicted in FIG. 7. As illustrated in FIG. 8, the overview shooting mode is used at the highest point, the 360-degree flight shooting mode is used at the second highest point, the overall roof shooting mode is used at the third highest point, and the roof details close-up shooting mode is used at the lowest point.

FIG. 9 is a diagram illustrating the first mode depicted in FIG. 7, which is a top-down overview of the house or building. In the process of assessing the damage of the house, the photos taken in this flight mode will be used as a map of the house, and all the detected damage will finally be projected to this picture, thus providing the insurance company with a global reference picture.

FIG. 10 is a diagram illustrating the second mode depicted in FIG. 7, which includes a 360-degree flight around the house or building, while capturing pictures from different angles of the house periphery. This kind of pictures plays a vital role in the generation of house measurement data.

FIG. 11 is a diagram illustrating the third mode depicted in FIG. 7, which is a detailed picture of the entire roof scanned above the roof of the house or building. Such picture is used to connect and establish correlations between the pictures taken in the first and fourth modes.

FIG. 12 is a diagram illustrating the fourth mode depicted in FIG. 7, which is the most detailed close-up photograph of the roof of the house or building. The empirical formula in the automatic flight algorithm of the drone determines the height and angle of the close-up photo capturing, so as to obtain the clearest photo for automatic damage identification. Limited by the sharpness of the drone lens (4K lens, no zoom or only 2× zoom), only photos collected at close range can be used for purposes of damage identification, and an accuracy of not less than 90% is guaranteed. Combining the above four shooting modes, generally a house or building needs to collect 30-100 photos depending on the size of the house or building.

FIG. 13 is a diagram illustrating the three-dimensional measurement result that is formed based on the high-definition photos captured by the drone. It includes four processing steps, which are image acquisition, 3D point cloud reconstruction, denoising section plane, and measurement report generation. In terms of the measurement precision of the drone photos collected in the automatic flight mode of the present disclosure the linear precision exceeds 99.5%, and the area precision exceeds 99%. It has earned general acceptance and recognition by the insurance industry in the United States. In terms of the processing time, the technology of the present disclosure is far ahead of other similar technologies.

Claim Platform:

After the drone photos are obtained, the photos will be automatically uploaded to the claim platform, which integrates the various functions and application interfaces required in the process.

FIG. 5 is a diagram of a claim information page of a claim settlement case. which contains the address of the house to be settled, the head of the household, insurance information, inspection arrangements, and other related content. At the same time, the user is allowed to select the type of report required on this page.

FIG. 14 is a diagram illustrating all the photos obtained by the drone as well as the classification information. Users can upload, download, delete, and add photos related to claim settlement on this page.

FIG. 15 illustrates a page for viewing and downloading the report. This page clearly displays all the reports required by the user. The user can download the report directly, or share the report to others directly through the claim platform by email.

The claim platform according to this disclosure is a multifunctional platform, and different page designs can be made depending on the nature and needs of different enterprises. The three pages mentioned above (the pages in FIG. 3, FIG. 12, and FIG. 13) are pages designed for insurance claims.

FIG. 16 illustrates a bidding page of the claim platform, which is specially designed for house maintenance companies and is also a direction for expansion of the use of the platform.

FIG. 6 is a flowchart illustrating the entire process of the apparatus of processing an insurance claim.

When a claim is received, the apparatus will search for drone pilots within 50 kilometers of the surrounding area based on the location of the building, automatically select the appropriate pilot based on the pilots' previous ratings and service ranges, and assign the task to that pilot. The pilot can accept or reject the task through the mobile app. If the task is rejected, the management personnel will step in for manual assignment and confirmation. FIG. 17 illustrates a page for manually assigning tasks.

After accepting the task, the pilot needs to contact the head of the household within 24 hours to confirm the investigation time, and arrive at the scene on time at the agreed investigation time for data collection and drone photo upload.

After the drone photos are uploaded back to the claim platform, the drone's automatic flight algorithm will automatically detect from multiple angles whether the photos meet the requirements and whether the information required for the claim is complete. If the preliminary review according to the apparatus is passed, the apparatus will automatically start to perform the house measurement and damage assessment, and finally formulate a complete claim report. If the preliminary review by the apparatus is not passed, the pilot will be notified of the missing information, and the pilot will conduct a secondary data collection.

After the claim report is approved by the apparatus, it will be directly submitted to the insurance company, which is convenient for the insurance company to carry out subsequent claim settlement matters.

This disclosure has at least the following innovative technical points and beneficial effects.

First of all, the drone automatic flight and collection technology according to the present disclosure does not require any modification to the drone. The automatic flight algorithm and flight modes of the drone are integrated into the mobile phone application, and the user can directly download and install it. Second, one-time data collection retains complete data correlation, and the marked data during flight speeds up the post-processing time. Third, all high-definition pictures can be uploaded automatically without removing the drone's storage disk. Fourth, the construction of the method and apparatus process, the automatic damage recognition algorithm, and the automatic report formulation minimize the post-processing time of claims and greatly reduce the cost of claims.

Experiments have shown that the processing procedure of the present disclosure can reduce the original claim settlement period of 2-4 weeks to 24-48 hours, and can achieve an accuracy of more than 95% for the identification of damage, especially the identification of high winds and hail. The cost is reduced by more than 90%.

In addition to the application in insurance claims, this disclosure also has large-scale applications in insurance underwriting. In addition to the application of this technology in houses or buildings, the present disclosure and its drone automatic flight and collection technology can be applied and expanded to different types of insurance, such as agricultural insurance, oil pipeline and high-voltage electrical inspection.

The numbering of the foregoing embodiments according to the present disclosure are intended for description purposes only, and do not indicate the advantages and disadvantages of the embodiments.

In the foregoing embodiments of the present disclosure, the description of each embodiment has its own focus. For parts that are not described in detail in an embodiment, reference may be made to the related description in other embodiments.

The foregoing merely portrays some illustrative embodiments of the present disclosure. It should be noted that those of ordinary skill in the art will be able to make multiple improvements and modifications without departing from the principle of this disclosure, and these improvements and modifications should all be regarded as falling in the scope of protection of this disclosure.

What is claimed is:

1. A method for processing an insurance claim, comprising:
    filing a claim by a user;
    dispatching a drone to take a picture of a claimed object at a location corresponding to location information contained in the claim to obtain a complete photo required for claim settlement, and identifying and marking out damage of the claimed object on the complete photo; and
    uploading the complete photo on which the damage of the claimed object has been identified and marked out online through a network, measuring the claimed object and assessing the damage of the claimed object according to the uploaded complete photo, and formulating a claim report.

2. The method of claim 1, further comprising:
    reviewing the claim report, and submitting the claim report to an insurance company after the claim report passes the review.

3. The method of claim 2, wherein the user files the claim through a mobile phone application, and flight parameters of the drone are set;
    wherein the drone is equipped with a drone automatic flight algorithm, which is configured to adjust a flight trajectory of the drone according to the set flight parameters and a shape and size of the claimed object, so as to take the least number of photos while achieving most comprehensive coverage of the entire claimed object, wherein the damage of the claimed object is identified and marked out on the complete photo by the drone automatic flight algorithm.

4. The method of claim 3, wherein the flight parameters of the drone comprise an outermost boundary of a land where the claimed object is located, an outer boundary of the claimed object itself, a number of layers of the claimed object, and an estimated height of the highest obstacle around the claimed object.

5. The method of claim 3, wherein modes for taking photos of the claimed object comprise overview shooting, 360-degree flight shooting, overall claimed object shooting, and claimed object details close-up shooting;
    and wherein height settings for taking photos of the claimed object comprise the following: the overview shooting is shooting at the highest point, the 360-degree flight shooting is shooting at the second highest point, the overall claimed object shooting is shooting at the third highest point, and the claimed object details close-up shooting is shooting at the lowest point.

6. The method of claim 5, wherein the drone automatic flight algorithm is configured to determine a height and angle for photo capture according to an empirical formula stored therein when operating under the claimed object details close-up shooting mode.

7. The method of claim 3, wherein the claimed object is a house, and the number of photos taken of the house lies in the range of 30-100.

8. The method of claim 1, wherein the operations of uploading the complete photo on which the damage of the claimed object has been identified and marked out online through a network, measuring the claimed object and assessing the damage of the claimed object according to the uploaded complete photo, and formulating the claim report comprise:
    uploading the complete photo on which the damage of the claimed object has been identified and marked out to a claim platform, performing 3D point cloud reconstruction and denoising section processing on the complete photo by the claim platform, and conducting a preliminary review of the complete photo; after the preliminary review is passed, measuring the claimed object, assessing the damage of the claimed object, and formulating the claim report; otherwise if the preliminary review fails, informing, by the claim platform, the drone of missing photo information and controlling the drone to perform a secondary photo data collection.

9. An apparatus for processing an insurance claim, comprising:
    a claim filing unit configured for allowing a user to file a claim;
    a photographing unit configured for dispatching a drone to take a picture of a claimed object at a location corresponding to location information contained in the claim to obtain a complete photo required for claim settlement, and identifying and marking damage of the claimed object on the complete photo;
    a claim report generation unit configured for uploading online the complete photo on which the damage of the claimed object has been identified and marked out through a network, measuring the claimed object and assessing the damage of the claimed object according to the uploaded complete photo, and formulating a claim report.

10. The apparatus of claim 9, further comprising:
    a claim report submission unit configured for reviewing the claim report, and submitting the claim report to an insurance company after passing the review.

* * * * *